US009650456B2

(12) United States Patent
McCauley et al.

(10) Patent No.: US 9,650,456 B2
(45) Date of Patent: May 16, 2017

(54) PROCESS FOR PRODUCING POLYDIENES

(71) Applicant: Bridgestone Corporation, Tokyo (JP)

(72) Inventors: Kevin M. McCauley, Akron, OH (US); Zengquan Qin, Copley, OH (US); Steven Luo, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 303 days.

(21) Appl. No.: 14/384,560

(22) PCT Filed: Mar. 12, 2013

(86) PCT No.: PCT/US2013/030349
§ 371 (c)(1),
(2) Date: Sep. 11, 2014

(87) PCT Pub. No.: WO2013/138270
PCT Pub. Date: Sep. 19, 2013

(65) Prior Publication Data
US 2015/0031845 A1 Jan. 29, 2015

Related U.S. Application Data

(60) Provisional application No. 61/610,536, filed on Mar. 14, 2012.

(51) Int. Cl.
C08F 136/06 (2006.01)
C08F 36/04 (2006.01)
C08F 36/06 (2006.01)
C08F 136/04 (2006.01)
C08F 2/40 (2006.01)

(52) U.S. Cl.
CPC .............. *C08F 136/06* (2013.01); *C08F 2/40* (2013.01); *C08F 36/04* (2013.01); *C08F 36/06* (2013.01); *C08F 136/04* (2013.01)

(58) Field of Classification Search
CPC ........ C08F 136/06; C08F 2/40; C08F 136/04; C08F 36/04; C08F 36/06
See application file for complete search history.

(56) References Cited

U.S. PATENT DOCUMENTS

| | | |
|---|---|---|
| 3,205,215 A | 9/1965 | Hsieh |
| 3,297,667 A | 1/1967 | von Dohlen et al. |
| 3,770,710 A | 11/1973 | Futamura et al. |
| 3,794,604 A | 2/1974 | Throckmorton et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,575,538 A | 3/1986 | Hsieh et al. |
| 4,696,984 A | 9/1987 | Carbonaro et al. |
| 4,710,553 A | 12/1987 | Carbonaro et al. |
| 4,736,001 A | 4/1988 | Carbonaro et al. |
| 4,906,706 A | 3/1990 | Hattori et al. |
| 4,990,573 A | 2/1991 | Andreussi et al. |
| 5,064,910 A | 11/1991 | Hattori et al. |
| 5,567,784 A | 10/1996 | Wieder et al. |
| 6,437,205 B1 | 8/2002 | Miller et al. |
| 6,521,726 B1 | 2/2003 | Kimura et al. |
| 6,897,270 B2 | 5/2005 | Ozawa et al. |
| 7,008,899 B2 | 3/2006 | Luo et al. |
| 7,094,849 B2 | 8/2006 | Luo et al. |
| 7,288,611 B2 | 10/2007 | Jiang et al. |
| 7,351,776 B2 | 4/2008 | Tartamella et al. |
| 7,396,889 B2 | 7/2008 | Robert |
| 7,572,867 B2 | 8/2009 | Tartamella et al. |
| 7,741,418 B2 | 6/2010 | Luo et al. |
| 7,799,725 B2 | 9/2010 | Suzuki et al. |
| 7,807,763 B2 | 10/2010 | Smale et al. |
| 2003/0125487 A1 | 7/2003 | Hsu et al. |

FOREIGN PATENT DOCUMENTS

| | | |
|---|---|---|
| CN | 101225134 A | 7/2008 |
| EP | 0629640 A1 | 12/1994 |
| EP | 1939221 A2 | 7/2008 |
| EP | 2022803 A2 | 2/2009 |
| EP | 2075266 A2 | 7/2009 |
| WO | 2010151648 A1 | 12/2010 |
| WO | 2011028523 A2 | 3/2011 |

OTHER PUBLICATIONS

Adams, Florian, International Search Report with Written Opinion from PCT/US2013/030349, 10 pp. (Jul. 30, 2013).
Friebe, Lars, "Neodymium Based Ziegler/Natta Catalysts and their Application in Diene Polymerization," Advances in Polymer Science 204, pp. 1-154 (2006).
Hsieh, H.L. et al., "Polymerization of Butadiene and Isoprene with Lanthanide Catalysts; Characterization and Properties of Homopolymers and Copolymers," Rubber Chemistry and Technology, vol. 58, No. 1, pp. 117-145 (Mar. 1985).
Quirk, R.P. et al., "Butadiene polymerization using neodymium versatate-based catalysts: catalyst optimization and effects of water and excess versatic acid," Polymer, vol. 41, pp. 5903-5908 (2000).
Shen, Zhiquan et al., "The Characteristics of Lanthanide Coordination Catalysts and the Cis-Polydienes Prepared Therewith," Journal of Polymer Science: Polymer Chemistry Edition, vol. 18, Issue 12, pp. 3345-3357 (Dec. 1980).
Wilson, David J., "A Nd-Carboxylate Catalyst for the Polymerization of 1,3-Butadiene: The Effect of Alkylaluminums and Alkylaluminum Chlorides," Journal of Polymer Science: Part A: Polymer Chemistry, vol. 33, Issue 14, pp. 2505-2513 (Oct. 1995).

*Primary Examiner* — Catherine S Branch
(74) *Attorney, Agent, or Firm* — Meredith E. Hooker; Arthur M. Reginelli

(57) ABSTRACT

A method for producing a polydiene, the method comprising the steps of (i) forming an active catalyst by combining a lanthanide-containing compound, an alkylating agent, and a halogen source in the substantial absence of an organosulfide; and (ii) polymerizing conjugated diene monomer in the presence of the active catalyst and an organosulfide.

21 Claims, No Drawings

PROCESS FOR PRODUCING POLYDIENES

This application claims the benefit of U.S. Provisional Application Ser. No. 61/610,536, filed on Mar. 14, 2012, which is incorporated herein by reference.

FIELD OF THE INVENTION

One or more embodiments of the present invention relate to a method for producing polydienes.

BACKGROUND OF THE INVENTION

Synthetically produced polymers such as polydienes are used in the art of manufacturing tires. Synthetic polymers that undergo strain-induced crystallization provide advantageous properties such as tensile strength and abrasion resistance. Thus, cis-1,4-polydienes with high cis-1,4-linkage content, which exhibit the increased ability to undergo strain-induced crystallization, have been advantageously employed. Also, certain functionalized polymers have been used in the manufacture of tires to prepare vulcanizates that demonstrate reduced hysteresis, i.e., less loss of mechanical energy to heat. It is believed that the functional group of the functionalized polymers reduces the number of free polymer chain ends via interaction with filler particles and may also reduce filler agglomeration. Thus, cis-1,4-polydienes have advantageously been functionalized to provide vulcanizates that undergo strain-induced crystallization and demonstrate reduced hysteresis. The ability to functionalize the polymer, particularly at its chain end, depends on the reactivity of the polymer. Typically, only a fraction of the polymer molecules in any given sample can be reacted with functionalizing agents. It is therefore desirable to develop a method for producing cis-1,4-polydienes having higher cis-1,4-linkage content and a greater percentage of reactive chain ends for functionalization.

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economical reasons but is slow enough to allow for the removal of the heat from the polymerization exotherm in order to ensure the process safety.

Lanthanide-based catalyst systems that comprise a lanthanide-containing compound, an alkylating agent, and a halogen source are known to be useful for producing conjugated diene polymers having high cis-1,4-linkage contents. Nevertheless, when applied to bulk polymerization of conjugated dienes, lanthanide-based catalyst systems, especially those comprising an aluminoxane compound as a catalyst component, often give excessively fast polymerization rates, which makes it very difficult to control the temperature and compromises the process safety. Therefore, it is desirable to develop a method of moderating the bulk polymerization of conjugated dienes catalyzed by lanthanide-based catalysts.

SUMMARY OF THE INVENTION

One or more embodiments of the present invention provide a method for producing a polydiene, the method comprising the steps of (i) forming an active catalyst by combining a lanthanide-containing compound, an alkylating agent, and a halogen source in the substantial absence of an organosulfide; and (ii) polymerizing conjugated diene monomer in the presence of the active catalyst and an organosulfide.

Other embodiments of the present invention provide a method for producing a polydiene, the method comprising the steps of (i) preparing a preformed catalyst by introducing a lanthanide-containing compound, an alkylating agent, a halogen source, and optionally monomer; (ii) independent of step (i), introducing a organosulfide; and (iii) polymerizing the conjugated diene monomer with the preformed catalyst.

DETAILED DESCRIPTION OF ILLUSTRATIVE EMBODIMENTS

Embodiments of this invention are based, at least in part, on the discovery of a process for producing high cis-1,4-polydienes that includes polymerizing conjugated dienes with a lanthanide-based catalyst in the presence of an organosulfide. While the prior art contemplates inclusion of organosulfides in lanthanide-based catalyst systems for the purpose of solubilizing the lanthanide compound, it has now been observed that the presence of the organosulfides during polymerization is particularly advantageous in bulk polymerization systems because it has been discovered that the organosulfide modulates the polymerization rate and thereby facilitates temperature control and reduces the risk of runaway reactions in bulk polymerizations. Also, the presence of the organosulfide during polymerization produces polymers characterized by a relatively high percentage of chain ends possessing a reactive end.

Practice of the present invention is not necessarily limited by the selection of any particular lanthanide-based catalyst system. In one or more embodiments, the catalyst systems employed include (a) a lanthanide-containing compound, (b) an alkylating agent, and (c) a halogen source. In other embodiments, a compound containing a non-coordinating anion or a non-coordinating anion precursor can be employed in lieu of a halogen source. In these or other embodiments, other organometallic compounds, Lewis bases, and/or polymerization modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. Also, the organosulfide can be used in conjunction with other polymerization modulators such as dihydrocarbyl ethers, as disclosed in U.S. Pat. No. 7,741,418, or amines, as disclosed in International App. No. PCT/US2011/051717, which are incorporated herein by reference.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

As mentioned above, the catalyst systems employed in the present invention includes a lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl)phosphate, neodymium (1-methylheptyl) (2-ethylhexyl)phosphate, and neodymium (2-ethylhexyl) (p-nonylphenyl)phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl)(2-ethylhexyl)phosphinate, and neodymium (2-ethylhexyl)(p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide; suitable neodymium pseudo-halides include, but are not limited to, neodymium cyanide, neodymium cyanate, neodymium thiocyanate, neodymium azide, and neodymium ferrocyanide; and suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing these classes of neodymium compounds in inert organic solvents. Where lanthanide halides, lanthanide oxyhalides, or other lanthanide-containing compounds containing a halogen atom are employed, the lanthanide-containing compound may also serve as all or part of the halogen source in the above-mentioned catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. Where the organoaluminum compound includes a halogen atom, the organoaluminum compound can serve as both the alkylating agent and at least a portion of the halogen source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$, include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

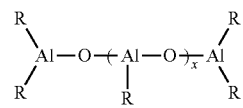

and oligomeric cyclic aluminoxanes, which can be represented by the general formula:

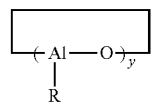

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of mol of the aluminoxane as used in this application refers to the number of mol of the aluminum atoms rather than the number of mol of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be preformed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the organomagnesium compound includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride.

Hydrogen halides include, but are not limited to, hydrogen fluoride, hydrogen chloride, hydrogen bromide, and hydrogen iodide.

Organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide (also called α,α-dibromotoluene or benzal bromide), methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, methyl bromoformate, carbon tetrabromide (also called tetrabromomethane), tribromomethane (also called bromoform), bromomethane, dibromomethane, 1-bromopropane, 2-bromopropane, 1,3-dibromopropane, 2,2-dimethyl-1-bromopropane (also called neopentyl bromide), formyl bromide, acetyl bromide, propionyl bromide, butyryl bromide, isobutyryl bromide, valeroyl bromide, isovaleryl bromide, hexanoyl bromide, benzoyl bromide, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, methyl 4-bromobenzoate, iodomethane, diiodomethane, triiodomethane (also called iodoform), tetraiodomethane, 1-iodopropane, 2-iodopropane, 1,3-diiodopropane, t-butyl iodide, 2,2-dimethyl-1-iodopropane (also called neopentyl iodide), allyl iodide, iodobenzene, benzyl iodide, diphenylmethyl iodide, triphenylmethyl iodide, benzylidene iodide (also called benzal iodide or α,α-diiodotoluene), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the above-described catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

As discussed above, an active catalyst is formed when the lanthanide-containing compound, the alkylating agent, and the halogen source are introduced. According to this invention, this takes place in the substantial absence of an organosulfide. The resulting active catalyst is capable of polymerizing conjugated diene monomer to form a high cis-1,4-polydiene. Without wishing to be bound by any particular theory, it is believed that the active catalyst includes a π-allyl complex as an active intermediate that is capable of coordinating with monomer and inserting monomer into a covalent bond between an active lanthanide metal center and a growing polymer chain.

Although one or more active catalyst species are believed to result from the combination of the catalyst ingredients, the degree of interaction or reaction between the various catalyst ingredients or components is not known with any great degree of certainty. Therefore, the term active catalyst or catalyst composition has been employed to encompass a simple mixture of the ingredients, a complex of the various ingredients that is caused by physical or chemical forces of attraction, a chemical reaction product of the ingredients, or a combination of the foregoing ingredients, so long as this mixture, complex, reaction product, or combination is capable of polymerizing monomer as discussed above.

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide-containing compound is best described in terms of the ratio of the mole of halogen atoms in the halogen source to the mole of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

The active catalyst can be formed by various methods.

In one or more embodiments, the active catalyst may be preformed by using a preforming procedure. That is, the catalyst ingredients are pre-mixed outside the polymerization system either in the absence of any monomer or in the presence of a small amount of at least one conjugated diene monomer at an appropriate temperature, which may be from about −20° C. to about 80° C. The resulting catalyst composition may be referred to as a preformed catalyst. The preformed catalyst may be aged, if desired, prior to being added to the monomer that is to be polymerized. As used herein, reference to a small amount of monomer refers to a catalyst loading of greater than 2 mmol, in other embodiments greater than 3 mmol, and in other embodiments greater than 4 mmol of lanthanide-containing compound per 100 g of monomer during the catalyst formation. In particular embodiments, the preformed catalyst may be prepared by an in-line preforming procedure whereby the catalyst ingredients are introduced into a feed line wherein they are mixed either in the absence of any monomer or in the presence of a small amount of at least one conjugated diene monomer. The resulting preformed catalyst can be either stored for future use or directly fed to the monomer that is to be polymerized.

In other embodiments, the active catalyst may be formed in situ by adding the catalyst ingredients, in either a stepwise or simultaneous manner, to the monomer to be polymerized. In one embodiment, the alkylating agent can be added first, followed by the lanthanide-containing compound, and then followed by the halogen source or by the compound containing a non-coordinating anion or the non-coordinating anion precursor. In one or more embodiments, two of the catalyst ingredients can be pre-combined prior to addition to the monomer. For example, the lanthanide-containing compound and the alkylating agent can be pre-combined and added as a single stream to the monomer. Alternatively, the halogen source and the alkylating agent can be pre-combined and added as a single stream to the monomer. An in situ formation of the catalyst may be characterized by a catalyst loading of less than 2 mmol, in other embodiments less than 1 mmol, in other embodiments less than 0.2 mmol, in other embodiments less than 0.1 mmol, in other embodiments less than 0.05 mmol, and in other embodiments less than or equal to 0.006 mmol of lanthanide-containing compound per 100 g of monomer during the catalyst formation.

Regardless of the method employed to prepare the active catalyst, the active catalyst is formed in the substantial absence of an organosulfide. As used herein, reference to a substantial absence refers to that amount of organosulfide or less that will not deleteriously impact the formation or performance of the catalyst. In one or more embodiments, the active catalyst is formed in the presence of less than 10 mole, in other embodiments in the presence of less than 2 mole, and in other embodiments in the presence of less than 1 mole of organosulfide per mole of lanthanide metal in the lanthanide-containing compound. In other embodiments, the catalyst is formed in the essential absence of an organosulfide, which refers to a de minimis amount or less of organosulfide. In particular embodiments, the active catalyst is formed in the complete absence of organosulfide.

After the active catalyst is prepared by either a preforming procedure or in situ, the polymerization of conjugated diene monomer is conducted in presence of the active catalyst and an organosulfide. In one or more embodiments, the organosulfide is introduced directly and individually to the monomer solution (or bulk monomer) that is to be polymerized. In other words, prior to being introduced to the polymerization system, the organosulfide is not complexed with the various catalyst ingredients.

In one or more embodiments, the organosulfide may be present in the monomer solution (or bulk monomer) prior to the introduction of the preformed catalyst. For example, the organosulfide is introduced directly and individually to the monomer solution (or bulk monomer), and then the preformed catalyst is introduced to the mixture of the monomer and organosulfide. In these embodiments, the introduction of the organosulfide to the monomer solution (or bulk monomer) forms a monomer/organosulfide blend that is devoid of active catalyst prior to the introduction of the preformed catalyst.

In other embodiments, the organosulfide and the preformed catalyst may be added simultaneously, yet separately and individually, to the monomer solution (or bulk monomer) that is to be polymerized.

In other embodiments, the organosulfide is introduced to the preformed catalyst before the preformed catalyst is introduced to the monomer solution (or bulk monomer). Therefore, in these embodiments, the organosulfide and the preformed catalyst are introduced to the monomer solution (or bulk monomer) as a single stream. For example, where the preformed catalyst is prepared by an in-line preforming procedure as described above, the organosulfide can be added to the preformed catalyst in line after formation of the catalyst. In some embodiments, the stream including the organosulfide and the preformed catalyst is introduced to the monomer solution (or bulk monomer) within a relatively short time after the organosulfide and the preformed catalyst are brought into contact. In particular embodiments, the stream including the organosulfide and the preformed catalyst is introduced to the monomer solution (or bulk monomer) within less than 1 minute after the organosulfide and the preformed catalyst are brought into contact.

In other embodiments, the organosulfide is introduced to the monomer solution (or bulk monomer) after introduction of the catalyst ingredients for forming the active catalyst or introduction of the preformed catalyst. In other words, the organosulfide is introduced to the monomer solution (or bulk monomer) that contains the active catalyst. As described above, the active catalyst may be formed by a preforming procedure or in situ. As those skilled in the art appreciate, where the active catalyst is present in the monomer solution (or bulk monomer) prior to the introduction of the organosulfide, the active catalyst may be in the form of propagating oligomeric species at the time the organosulfide is introduced. In this regard, those skilled in the art will appreciate that reference to active catalyst may refer to low molecular weight living or pseudo-living oligomeric species. In one or more embodiments, the organosulfide is introduced before 5%, in other embodiments before 3%, in other embodiments before 1%, and in other embodiments before 0.5% of the monomer is polymerized.

In one or more embodiments, suitable organosulfides include those compounds represented by the formula R—S—R, where each R is independently a monovalent organic group, or where two R groups combine to form a divalent organic group. In one or more embodiments, the monovalent organic group is a hydrocarbyl group or substituted hydrocarbyl group. Examples of hydrocarbyl groups or substituted hydrocarbyl groups include, but are not limited to, alkyl, cycloalkyl, substituted cycloalkyl, alkenyl, cycloalkenyl, aryl, substituted aryl groups, and heterocyclic groups. The hydrocarbyl group may contain heteroatoms such as, but not limited to, nitrogen, oxygen, silicon, tin, sulfur, boron, and phosphorous atoms.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

Suitable types of organosulfides include, but are not limited to, dialkyl sulfides, dicycloalkyl sulfides, diaryl sulfides, alkyl cycloalkyl sulfides, alkyl aryl sulfides, cycloalkyl aryl sulfides, cyclic non-aromatic sulfides, and aromatic sulfides.

Specific examples of dialkyl sulfides include, but are not limited to, dimethyl sulfide, diethyl sulfide, di-n-propyl sulfide, diisopropyl sulfide, di-n-butyl sulfide, diisobutyl sulfide, di-t-butyl sulfide, di-n-pentyl sulfide, diisopentyl sulfide, dineopentyl sulfide, di-n-hexyl sulfide, di-n-heptyl sulfide, di-2-ethylhexyl sulfide, di-n-octyl sulfide, di-n-nonyl sulfide, di-n-decyl sulfide, di-n-undecyl sulfide, di-n-dodecyl sulfide, ethyl methyl sulfide, methyl n-propyl sulfide, ethyl n-propyl sulfide, isopropyl methyl sulfide, ethyl isopropyl sulfide, isopropyl n-propyl sulfide, n-butyl methyl sulfide, n-butyl ethyl sulfide, n-butyl n-propyl sulfide, n-butyl isopropyl sulfide, isobutyl methyl sulfide, ethyl isobutyl sulfide, isobutyl n-propyl sulfide, isobutyl isopropyl sulfide, isobutyl n-butyl sulfide, t-butyl methyl sulfide, ethyl t-butyl sulfide, t-butyl n-propyl sulfide, t-butyl isopropyl sulfide, n-butyl t-butyl sulfide, t-butyl isobutyl sulfide, methyl n-pentyl sulfide, ethyl n-pentyl sulfide, n-pentyl n-propyl sulfide, isopropyl n-pentyl sulfide, n-butyl n-pentyl sulfide, isobutyl n-pentyl sulfide, t-butyl n-pentyl sulfide, isopentyl methyl sulfide, ethyl isopentyl sulfide, isopentyl n-propyl sulfide, isopentyl isopropyl sulfide, n-butyl isopentyl sulfide, isobutyl isopentyl sulfide, t-butyl isopentyl sulfide, isopentyl n-pentyl sulfide, methyl neopentyl sulfide, ethyl neopentyl sulfide, neopentyl n-propyl sulfide, isopropyl neopentyl sulfide, n-butyl neopentyl sulfide, isobutyl neopentyl sulfide, t-butyl neopentyl sulfide, n-pentyl neopentyl sulfide, isopentyl neopentyl sulfide, n-hexyl methyl sulfide, ethyl n-hexyl sulfide, n-hexyl n-propyl sulfide, n-hexyl isopropyl sulfide, n-butyl n-hexyl sulfide, n-hexyl isobutyl sulfide, t-butyl n-hexyl sulfide, n-hexyl n-pentyl sulfide, n-hexyl isopentyl sulfide, n-hexyl neopentyl sulfide, n-heptyl methyl sulfide, ethyl n-heptyl sulfide, n-heptyl n-propyl sulfide, n-heptyl isopropyl sulfide, n-butyl n-heptyl sulfide, n-heptyl isobutyl sulfide, t-butyl n-heptyl sulfide, n-heptyl n-pentyl sulfide, n-heptyl isopentyl sulfide, n-heptyl neopentyl sulfide, n-heptyl n-hexyl sulfide, 2-ethylhexyl methyl sulfide, 2-ethylhexyl ethyl sulfide, 2-ethylhexyl n-propyl sulfide, 2-ethylhexyl isopropyl sulfide, n-butyl 2-ethylhexyl sulfide, 2-ethylhexyl isobutyl sulfide, t-butyl 2-ethylhexyl sulfide, 2-ethylhexyl n-pentyl sulfide, 2-ethylhexyl isopentyl sulfide, 2-ethylhexyl neopentyl sulfide, 2-ethylhexyl n-hexyl sulfide, 2-ethylhexyl n-heptyl sulfide, methyl n-octyl sulfide, ethyl n-octyl sulfide, n-octyl n-propyl sulfide, isopropyl n-octyl sulfide, n-butyl n-octyl sulfide, isobutyl n-octyl sulfide, t-butyl n-octyl sulfide, n-octyl n-pentyl sulfide, isopentyl n-octyl sulfide, neopentyl n-octyl sulfide, n-hexyl n-octyl sulfide, n-heptyl n-octyl sulfide, 2-ethylhexyl n-octyl sulfide, methyl n-nonyl sulfide, ethyl n-nonyl sulfide, n-nonyl n-propyl sulfide, isopropyl n-nonyl sulfide, n-butyl n-nonyl sulfide, isobutyl n-nonyl sulfide, t-butyl n-nonyl sulfide, n-nonyl n-pentyl sulfide, isopentyl n-nonyl sulfide, neopentyl n-nonyl sulfide, n-hexyl n-nonyl sulfide, n-heptyl n-nonyl sulfide, 2-ethylhexyl n-nonyl sulfide, n-nonyl n-octyl sulfide, n-decyl methyl sulfide, ethyl n-decyl sulfide, n-decyl n-propyl sulfide, n-decyl isopropyl sulfide, n-butyl n-decyl sulfide, n-decyl isobutyl sulfide, t-butyl n-decyl sulfide, n-decyl n-pentyl sulfide, n-decyl isopentyl sulfide, n-decyl neopentyl sulfide, n-decyl n-hexyl sulfide, n-decyl n-heptyl sulfide, n-decyl 2-ethylhexyl sulfide, n-decyl n-octyl sulfide, n-decyl n-nonyl sulfide, methyl n-undecyl sulfide, ethyl n-undecyl sulfide, n-propyl n-undecyl sulfide, isopropyl n-undecyl sulfide, n-butyl n-undecyl sulfide, isobutyl n-undecyl sulfide, t-butyl n-undecyl sulfide, n-pentyl n-undecyl sulfide, isopentyl n-undecyl sulfide, neopentyl n-undecyl sulfide, n-hexyl n-undecyl sulfide, n-heptyl n-undecyl sulfide, 2-ethylhexyl n-undecyl sulfide, n-octyl n-undecyl sulfide, n-nonyl n-undecyl sulfide, n-decyl n-undecyl sulfide, n-dodecyl methyl sulfide, ethyl n-dodecyl sulfide, n-dodecyl n-propyl sulfide, isopropyl n-dodecyl sulfide, n-butyl n-dodecyl sulfide, n-dodecyl isobutyl sulfide, t-butyl n-dodecyl sulfide, n-dodecyl n-pentyl sulfide, n-dodecyl isopentyl sulfide, n-dodecyl neopentyl sulfide, n-dodecyl n-hexyl sulfide, n-dodecyl n-heptyl sulfide, n-dodecyl 2-ethylhexyl sulfide, n-dodecyl n-octyl sulfide, n-dodecyl n-nonyl sulfide, n-decyl n-dodecyl sulfide, n-dodecyl n-undecyl sulfide, benzyl methyl sulfide, benzyl ethyl sulfide, benzyl n-propyl sulfide, benzyl isopropyl sulfide, benzyl n-butyl sulfide, benzyl isobutyl sulfide, benzyl t-butyl sulfide, benzyl n-pentyl sulfide, benzyl isopentyl sulfide, benzyl neopentyl sulfide, n-hexyl benzyl sulfide, n-heptyl benzyl sulfide, 2-ethylhexyl benzyl sulfide, benzyl n-octyl sulfide, benzyl n-nonyl sulfide, benzyl n-decyl sulfide, benzyl n-undecyl sulfide, dibenzyl sulfide, and benzyl n-dodecyl sulfide.

Specific examples of dicycloalkyl sulfides include, but are not limited to, dicyclopropyl sulfide, dicyclobutyl sulfide, dicyclopentyl sulfide, dicyclohexyl sulfide, dicyclooctyl sulfide, di-2-methylcyclohexyl sulfide, di-2-t-butylcyclohexyl sulfide, di-4-t-butylcyclohexyl sulfide, cyclobutyl cyclopropyl sulfide, cyclopentyl cyclopropyl sulfide, cyclobutyl cyclopentyl sulfide, cyclohexyl cyclopropyl sulfide, cyclobutyl cyclohexyl sulfide, cyclohexyl cyclopentyl sulfide, cyclooctyl cyclopropyl sulfide, cyclobutyl cyclooctyl sulfide, cyclooctyl cyclopentyl sulfide, cyclohexyl cyclooctyl sulfide, cyclopropyl 2-methylcyclohexyl sulfide, cyclobutyl 2-methylcyclohexyl sulfide, cyclopentyl 2-methylcyclohexyl sulfide, cyclohexyl 2-methylcyclohexyl sulfide, 2-methylcyclohexyl cyclooctyl sulfide, 2-t-butylcyclohexyl cyclopropyl sulfide, 2-t-butylcyclohexyl cyclobutyl sulfide, 2-t-butylcyclohexyl cyclopentyl sulfide, 2-t-butylcyclohexyl cyclohexyl sulfide, 2-t-butylcyclohexyl cyclooctyl sulfide, 2-t-butylcyclohexyl 2-methylcyclohexyl sulfide, 4-t-butylcyclohexyl cyclopropyl sulfide, 4-t-butylcyclohexyl cyclobutyl sulfide, 4-t-butylcyclohexyl cyclopentyl sulfide, 4-t-butylcyclohexyl cyclohexyl sulfide, 4-t-butylcyclohexyl cyclooctyl sulfide, 4-t-butylcyclohexyl 2-methylcyclohexyl sulfide, and 2-t-butylcyclohexyl 4-t-butylcyclohexyl sulfide.

Specific examples of diaryl sulfides include, but are not limited to, diphenyl sulfide, di-2-pyridyl sulfide, di-o-tolyl sulfide, di-m-tolyl sulfide, di-p-tolyl sulfide, 2-pyridyl phenyl sulfide, o-tolyl phenyl sulfide, o-tolyl 2-pyridyl sulfide, m-tolyl phenyl sulfide, m-tolyl 2-pyridyl sulfide, m-tolyl o-tolyl sulfide, p-tolyl phenyl sulfide, p-tolyl 2-pyridyl sulfide, p-tolyl o-tolyl sulfide, and p-tolyl m-tolyl sulfide.

Specific examples of alkyl cycloalkyl sulfides include, but are not limited to, cyclopropyl methyl sulfide, cyclobutyl methyl sulfide, cyclopentyl methyl sulfide, cyclohexyl methyl sulfide, cyclooctyl methyl sulfide, methyl 2-methylcyclohexyl sulfide, 2-t-butylcyclohexyl methyl sulfide, 4-t-butylcyclohexyl methyl sulfide, cyclopropyl ethyl sulfide, ethyl cyclobutyl sulfide, ethyl cyclopentyl sulfide, ethyl cyclohexyl sulfide, ethyl cyclooctyl sulfide, ethyl 2-methylcyclohexyl sulfide, 2-t-butylcyclohexyl sulfide, ethyl 4-t-butylcyclohexyl sulfide, cyclopropyl n-propyl sulfide, cyclobutyl n-propyl sulfide, cyclopentyl n-propyl sulfide, cyclohexyl n-propyl sulfide, cyclooctyl n-propyl sulfide, 2-methylcyclohexyl n-propyl sulfide, 2-t-butylcyclohexyl n-propyl sulfide, 4-t-butylcyclohexyl n-propyl sulfide, cyclopropyl isopropyl sulfide, cyclobutyl isopropyl sulfide, cyclopentyl isopropyl sulfide, cyclohexyl isopropyl sulfide, cyclooctyl isopropyl sulfide, isopropyl 2-methylcyclohexyl sulfide, 2-t-butylcyclohexyl isopropyl sulfide, 4-t-butylcyclohexyl isopropyl sulfide, n-butyl cyclopropyl sulfide, n-butyl cyclobutyl sulfide, n-butyl cyclopentyl sulfide, n-butyl cyclohexyl sulfide, n-butyl cyclooctyl sulfide, n-butyl 2-methylcyclohexyl sulfide, n-butyl 2-t-butylcyclohexyl sulfide, n-butyl 4-t-butylcyclohexyl sulfide, cyclopropyl isobutyl sulfide, cyclobutyl isobutyl sulfide, cyclopentyl isobutyl sulfide, cyclohexyl isobutyl sulfide, cyclooctyl isobutyl sulfide, isobutyl 2-methylcyclohexyl sulfide, 2-t-butylcyclohexyl isobutyl sulfide, 4-t-butylcyclohexyl isobutyl sulfide, t-butyl cyclopropyl sulfide, t-butyl cyclobutyl sulfide, t-butyl cyclopentyl sulfide, t-butyl cyclohexyl sulfide, t-butyl cyclooctyl sulfide, t-butyl 2-methylcyclohexyl sulfide, t-butyl 2-t-butylcyclohexyl sulfide, t-butyl 4-t-butylcyclohexyl sulfide, cyclopropyl n-pentyl sulfide, cyclobutyl n-pentyl sulfide, cyclopentyl n-pentyl sulfide, cyclohexyl n-pentyl sulfide, cyclooctyl n-pentyl sulfide, 2-methylcyclohexyl n-pentyl sulfide, 2-t-butylcyclohexyl n-pentyl sulfide, 4-t-butylcyclohexyl n-pentyl sulfide, cyclopropyl isopentyl sulfide, cyclobutyl isopentyl sulfide, cyclopentyl isopentyl sulfide, cyclohexyl isopentyl sulfide, cyclooctyl isopentyl sulfide, isopentyl 2-methylcyclohexyl sulfide, 2-t-butylcyclohexyl isopentyl sulfide, 4-t-butylcyclohexyl isopentyl sulfide, cyclopropyl neopentyl sulfide, cyclobutyl neopentyl sulfide, cyclopentyl neopentyl sulfide, cyclohexyl neopentyl sulfide, cyclooctyl neopentyl sulfide, 2-methylcyclohexyl neopentyl sulfide, 2-t-butylcyclohexyl neopentyl sulfide, 4-t-butylcyclohexyl neopentyl sulfide, cyclopropyl n-hexyl sulfide, cyclobutyl n-hexyl sulfide, cyclopentyl n-hexyl sulfide, cyclohexyl n-hexyl sulfide, cyclooctyl n-hexyl sulfide, n-hexyl 2-methylcyclohexyl sulfide, 2-t-butylcyclohexyl n-hexyl sulfide, 4-t-butylcyclohexyl n-hexyl sulfide, cyclopropyl n-heptyl sulfide, cyclobutyl n-heptyl sulfide, cyclopentyl n-heptyl sulfide, cyclohexyl n-heptyl sulfide, cyclooctyl n-heptyl sulfide, n-heptyl 2-methylcyclohexyl sulfide, 2-t-butylcyclohexyl n-heptyl sulfide, 4-t-butylcyclohexyl n-heptyl sulfide, cyclopropyl 2-ethylhexyl sulfide, cyclobutyl 2-ethylhexyl sulfide, cyclopentyl 2-ethylhexyl sulfide, cyclohexyl 2-ethylhexyl sulfide, cyclooctyl 2-ethylhexyl sulfide, 2-ethylhexyl 2-methylcyclohexyl sulfide, 2-t-butylcyclohexyl 2-ethylhexyl sulfide, 4-t-butylcyclohexyl 2-ethylhexyl sulfide, cyclopropyl n-octyl sulfide, cyclobutyl n-octyl sulfide, cyclopentyl n-octyl sulfide, cyclohexyl n-octyl sulfide, cyclooctyl n-octyl sulfide, 2-methylcyclohexyl n-octyl sulfide, 2-t-butylcyclohexyl n-octyl sulfide, 4-t-butylcyclohexyl n-octyl sulfide, cyclopropyl n-nonyl sulfide, cyclobutyl n-nonyl sulfide, cyclopentyl n-nonyl sulfide, cyclohexyl n-nonyl sulfide, cyclooctyl n-nonyl sulfide, 2-methylcyclohexyl n-nonyl sulfide, 2-t-butylcyclohexyl n-nonyl sulfide, 4-t-butylcyclohexyl n-nonyl sulfide, cyclopropyl n-decyl sulfide, cyclobutyl n-decyl sulfide, cyclopentyl n-decyl sulfide, cyclohexyl n-decyl sulfide, cyclooctyl n-decyl sulfide, n-decyl 2-methylcyclohexyl sulfide, 2-t-butylcyclohexyl n-decyl sulfide, 4-t-butylcyclohexyl n-decyl sulfide, cyclopropyl n-undecyl sulfide, cyclobutyl n-undecyl sulfide, cyclopentyl n-undecyl sulfide, cyclohexyl n-undecyl sulfide, cyclooctyl n-undecyl sulfide, 2-methylcyclohexyl n-undecyl sulfide, 2-t-butylcyclohexyl n-undecyl sulfide, 4-t-butylcyclohexyl n-undecyl sulfide, cyclopropyl n-dodecyl sulfide, cyclobutyl n-dodecyl sulfide, cyclopentyl n-dodecyl sulfide, cyclohexyl n-dodecyl sulfide, cyclooctyl n-dodecyl sulfide, n-dodecyl 2-methylcyclohexyl sulfide, 2-t-butylcyclohexyl n-dodecyl sulfide, benzyl cyclopropyl sulfide, benzyl cyclobutyl sulfide, benzyl cyclopentyl sulfide, benzyl cyclohexyl sulfide, benzyl cyclooctyl sulfide, benzyl 2-methylcyclohexyl sulfide, benzyl 2-t-butylcyclohexyl sulfide, benzyl 4-t-butylcyclohexyl sulfide, and 4-t-butylcyclohexyl n-dodecyl sulfide.

Specific examples of alkyl aryl sulfides include, but are not limited to, methyl phenyl sulfide, methyl 2-pyridyl sulfide, ethyl phenyl sulfide, ethyl 2-pyridyl sulfide, phenyl n-propyl sulfide, n-propyl 2-pyridyl sulfide, isopropyl phenyl sulfide, isopropyl 2-pyridyl sulfide, n-butyl phenyl sulfide, n-butyl 2-pyridyl sulfide, isobutyl phenyl sulfide, isobutyl 2-pyridyl sulfide, t-butyl phenyl sulfide, t-butyl 2-pyridyl sulfide, n-pentyl phenyl sulfide, n-pentyl 2-pyridyl sulfide, isopentyl phenyl sulfide, isopentyl 2-pyridyl sulfide, neopentyl phenyl sulfide, neopentyl 2-pyridyl sulfide, n-hexyl phenyl sulfide, n-hexyl 2-pyridyl sulfide, n-heptyl phenyl sulfide, n-heptyl 2-pyridyl sulfide, 2-ethylhexyl phenyl sulfide, 2-ethylhexyl 2-pyridyl sulfide, n-octyl phenyl sulfide, n-octyl 2-pyridyl sulfide, n-nonyl phenyl sulfide, n-nonyl 2-pyridyl sulfide, n-decyl phenyl sulfide, n-decyl 2-pyridyl sulfide, phenyl n-undecyl sulfide, 2-pyridyl n-undecyl sulfide, n-dodecyl phenyl sulfide, benzyl phenyl sulfide, and n-dodecyl 2-pyridyl sulfide.

Specific examples of cycloalkyl aryl sulfides include, but are not limited to, cyclopropyl phenyl sulfide, cyclopropyl 2-pyridyl sulfide, cyclopropyl o-tolyl sulfide, cyclopropyl m-tolyl sulfide, cyclopropyl p-tolyl sulfide, cyclobutyl phenyl sulfide, cyclobutyl 2-pyridyl sulfide, cyclobutyl o-tolyl sulfide, cyclobutyl m-tolyl sulfide, cyclobutyl p-tolyl sulfide, cyclopentyl phenyl sulfide, cyclopentyl 2-pyridyl sulfide, cyclopentyl o-tolyl sulfide, cyclopentyl m-tolyl sulfide, cyclopentyl p-tolyl sulfide, cyclohexyl phenyl sulfide, cyclohexyl 2-pyridyl sulfide, cyclohexyl o-tolyl sulfide, cyclohexyl m-tolyl sulfide, cyclohexyl p-tolyl sulfide, cyclooctyl phenyl sulfide, cyclooctyl 2-pyridyl sulfide, cyclooctyl o-tolyl sulfide, cyclooctyl m-tolyl sulfide, cyclooctyl p-tolyl sulfide, 2-methylcyclohexyl phenyl sulfide, 2-methylcyclohexyl 2-pyridyl sulfide, 2-methylcyclohexyl o-tolyl sulfide, 2-methylcyclohexyl m-tolyl sulfide, 2-methylcyclohexyl p-tolyl sulfide, 2-t-butylcyclohexyl phenyl sulfide, 2-t-butylcyclohexyl 2-pyridyl sulfide, 2-t-butylcyclohexyl o-tolyl sulfide, 2-t-butylcyclohexyl m-tolyl sulfide, 2-t-butylcyclohexyl p-tolyl sulfide, 4-t-butylcyclohexyl phenyl sulfide, 4-t-butylcyclohexyl 2-pyridyl sulfide, 4-t-butylcyclohexyl o-tolyl sulfide, 4-t-butylcyclohexyl m-tolyl sulfide, and 4-t-butylcyclohexyl p-tolyl sulfide.

Specific examples of cyclic non-aromatic sulfides include, but are not limited to, thiirane, thietane, tetrahydrothiophene, tetrahydrothiopyran, and thiepane.

Specific examples of aromatic sulfides include, but are not limited to, thiophene, 4,6-dimethyldibenzothiophene, benzothiophene, 2-methylthiophene, 3-methylthiophene, and 2,5-dimethylthiophene.

In one or more embodiments, the amount of the organosulfide introduced to the monomer solution (or bulk monomer) to be polymerized, and therefore is present during polymerization, may be represented by the molar ratio of the organosulfide to the lanthanide-containing compound (organosulfide/Ln). In one or more embodiments, the organosulfide/Ln molar ratio is at least 10:1, in other embodiments at least 20:1, in other embodiments at least 30:1, in other embodiments at least 60:1, and in other embodiments at least 80:1. In these or other embodiments, the organosulfide/Ln molar ratio is less than 120:1, in other embodiments less than 80:1, and in other embodiments less than 60:1. In one or more embodiments, the organosulfide/Ln molar ratio is from about 10:1 to about 120:1, in other embodiments from about 20:1 to about 80:1, and in other embodiments from about 40:1 to about 100:1.

In other embodiments, the amount of the organosulfide introduced directly and individually to the monomer solution (or bulk monomer) to be polymerized may be expressed with respect to the amount of the monomer. In one or more embodiments, the amount of the organosulfide introduced is at least 0.01 mmol, in other embodiments at least 0.03 mmol, in other embodiments at least 0.2 mmol, in other embodiments at least 0.5 mmol, and in other embodiments at least 1.0 mmol per 100 g of monomer. In these or other embodiments, the amount of the organosulfide introduced is less than 100 mmol, in other embodiments less than 90 mmol, in other embodiments less than 70 mmol, in other embodiments less than 60 mmol, in other embodiments less than 50 mmol, in other embodiments less than 20 mmol, and in other embodiments less than 1.0 mmol per 100 g of monomer.

In one or more embodiments, a solvent may be employed as a carrier to either dissolve or suspend the catalyst, catalyst ingredients, and/or the organosulfide in order to facilitate the delivery of the same to the polymerization system. In other embodiments, monomer can be used as the carrier. In yet other embodiments, the catalyst ingredients or the organosulfide can be introduced in their neat state without any solvent.

In one or more embodiments, suitable solvents include those organic compounds that will not undergo polymerization or incorporation into propagating polymer chains during the polymerization of monomer in the presence of the catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

The production of polymer according to this invention can be accomplished by polymerizing conjugated diene monomer in the presence of a catalytically effective amount of the active catalyst. The introduction of the catalyst, the conjugated diene monomer, the organosulfide, and any solvent, if employed, forms a polymerization mixture in which a reactive polymer is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, the amount of the lanthanide-containing compound used can be varied from about 0.001 to about 2 mmol, in other embodiments from about 0.005 to about 1 mmol, and in still other embodiments from about 0.01 to about 0.2 mmol per 100 gram of monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization may be conducted in a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In particular embodiments, the polymerization takes place, or at least a portion of the polymerization takes place, at a temperature of at least 30° C., in other embodiments at least 40° C., and in other embodiments at least 50° C.

In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In particular embodiments, the rate of polymerization is controlled by using a variety of techniques including the use of an organosulfide. For example, in one or more embodiments, the polymerization rate may be maintained at a conversion rate of less than 5%, in other embodiments less than 4%, and in other embodiments less than 2% conversion of monomer per minute. In particular embodiments, the polymerization rate may be maintained at a conversion rate of greater than 0.3%, in other embodiments greater than 0.5%, in other embodiments greater than 0.8%, in other embodiments greater than 1.0%, and in other embodiments greater than 1.2% conversion of monomer per minute.

Some or all of the polymer chains of the resulting reactive polymer may possess reactive ends before the polymerization mixture is quenched. The reactive polymer prepared according to this invention may be referred to as a pseudo-living polymer. In one or more embodiments, a polymerization mixture including the reactive polymer may be referred to as an active polymerization mixture. The percentage of polymer chains possessing a reactive end depends on various factors such as the type of catalyst, the type of monomer, the purity of the ingredients, the polymerization temperature, the monomer conversion, and many other factors. In one or more embodiments, at least about 60% of the polymer chains possess a reactive end, in other embodiments at least about 70% of the polymer chains possess a reactive end, in other embodiments at least about 80% of the polymer chains possess a reactive end, and in still other embodiments at least about 90% of the polymer chains possess a reactive end.

Because the polydienes produced by the polymerization process of this invention may possess pseudo-living characteristics, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publ. Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Pat. Publ. No. 2007/0149717, hydrobenzamide compounds as disclosed in U.S. Pat. Publ. No. 2007/0276122, nitro compounds as disclosed in U.S. Pat. Publ. No. 2008/0051552, and protected oxime compounds as disclosed in U.S. Pat. Publ. No. 2008/0146745, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 mole, in other embodiments from about 5 to about 150 mole, and in other embodiments from about 10 to about 100 mole per mole of the lanthanide-containing compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in U.S. Pat. Publ. No. 2009/0043046, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has been introduced to the polymerization mixture and/or a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in U.S. Pat. Publ. No. 2009/0043055, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

In one or more embodiments, the polymers prepared according to this invention may contain unsaturation. In these or other embodiments, the polymers are vulcanizable. In one or more embodiments, the polymers can have a glass transition temperature ($T_g$) that is less than 0° C., in other embodiments less than −20° C., and in other embodiments less than −30° C. In one embodiment, these polymers may exhibit a single glass transition temperature. In particular embodiments, the polymers may be hydrogenated or partially hydrogenated.

In one or more embodiments, the polymers of this invention may be cis-1,4-polydienes having a cis-1,4-linkage content that is greater than 97%, in other embodiments greater than 98%, in other embodiments greater than 98.5%, in other embodiments greater than 99.0%, in other embodiments greater than 99.1% and in other embodiments greater than 99.2%, where the percentages are based upon the number of diene mer units adopting the cis-1,4-linkage versus the total number of diene mer units. Also, these polymers may have a 1,2-linkage content that is less than about 2%, in other embodiments less than 1.5%, in other embodiments less than 1%, and in other embodiments less than 0.5%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

In one or more embodiments, the number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question.

In one or more embodiments, the molecular weight distribution or polydispersity ($M_w/M_n$) of these polymers may be less than 5.0, in other embodiments less than 3.0, in other embodiments less than 2.5, in other embodiments less than 2.2, in other embodiments less than 2.1, in other embodiments less than 2.0, in other embodiments less than 1.8, and in other embodiments less than 1.5.

The polymers of this invention are particularly useful in preparing rubber compositions that can be used to manufacture tire components. Rubber compounding techniques and the additives employed therein are generally disclosed in *The Compounding and Vulcanization of Rubber*, in *Rubber Technology* ($2^{nd}$ Ed. 1973).

The rubber compositions can be prepared by using the polymers of this invention alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m²/g and in other embodiments at least 35 m²/g; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc., vol.* 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, *ENCYCLOPEDIA OF CHEMICAL TECHNOLOGY*, Vol. 20, pgs. 365-468, (3$^{rd}$ Ed. 1982), particularly *Vulcanization Agents and Auxiliary Materials*, pgs. 390-402, and A. Y. Coran, *Vulcanization, ENCYCLOPEDIA OF POLYMER SCIENCE AND ENGINEERING*, (2$^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer and silica in the substantial absence of coupling agents and shielding agents.

The rubber compositions prepared from the polymers of this invention are particularly useful for forming tire components such as treads, subtreads, sidewalls, body ply skims, bead filler, and the like. In one or more embodiments, these tread or sidewall formulations may include from about 10% to about 100% by weight, in other embodiments from about 35% to about 90% by weight, and in other embodiments from about 50% to about 80% by weight of the polymer of this invention based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities (ML$_{1+4}$) of the polymer samples were determined at 100° C. by using a Monsanto Mooney viscometer with a large rotor, a one-minute warm-up time, and a four-minute running time. The number average (Mn) and weight average (Mw) molecular weights of the polymer samples were determined by gel permeation chromatography (GPC). The GPC instrument was equipped with a differential refractive index (RI) detector and an ultraviolet (UV) absorption detector. The GPC UV/RI ratio, which is the ratio of the UV detector signal to the RI detector signal, was used to calculate the % functionality of the polymer samples by referencing the GPC UV/RI ratio of the functionalized cis-1,4-polybutadiene to the UV/RI ratio of a functionalized polybutadiene sample that is produced by using anionic polymerization and has the same Mn. The cis-1,4-linkage, trans-1,4-linkage, and 1,2-linkage contents of the polymer samples were determined by infrared spectroscopy.

Example 1

The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer and 15.6 ml of 0.4 M dibutyl sulfide ($Bu_2S$) in hexane was charged into the reactor. After the monomer/sulfide blend was thermostated at 32° C., the polymerization was initiated by charging into the reactor a preformed catalyst that had been prepared by mixing in the following order 6.5 g of 19.2 wt % 1,3-butadiene in hexane, 1.44 ml of 0.054 M neodymium versatate in hexane, 5.20 ml of 1.5 M methylaluminoxane (MAO) in toluene, 2.42 ml of 1.0 M diisobutylaluminum hydride (DIBAH) in hexane, and 6.24 ml of 0.017 M triiodomethane ($CHI_3$) in hexane and allowing the mixture to age for 15 minutes. After 5.8 minutes from its commencement, the polymer was functionalized by charging 10.0 ml of 1.0 M 4,4'-bis(diethylamino)benzophenone (DEAB) in toluene. After stirring for 5 minutes, the polymerization was terminated by diluting the polymerization mixture with 6.0 ml isopropanol dissolved in 1360 g of hexane and dropping the batch into 3 gallons of isopropanol containing 5 g of 2,6-di-tert-butyl-4-methylphenol. The coagulated polymer was drum-dried. Information relative to the polymerization and the polymer produced is provided in Table I.

Example 2

The same procedure as described in Example 1 was used in Examples 2 except $Oct_2S$ was used in place of $Bu_2S$. Information relative to the polymerization and the polymer produced is provided in Table I.

Example 3

The same procedure as described in Example 1 was used in Example 3 except 2.35 mL of 1.0 M DIBAH in hexane was added to the catalyst solution and no $Bu_2S$ was added to the 1,3-butadiene. Information relative to the polymerization and the polymer produced is provided in Table 1.

Comparing Example 1 with Example 3, the polymer prepared by bulk polymerization using the triiodomethane-activated catalyst in the presence of dibutyl sulfide have increased cis-1,4-linkage content and increased percent functionalities when compared to the bulk polymer prepared in the absence of a dibutyl sulfide. The presence of the dibutyl sulfide during the bulk polymerization decreases the rate of conversion per minute which gives improved control of the polymerization exotherm and prevents gel formation inside the reactor.

Comparing Example 2 with Example 3, the polymer prepared by bulk polymerization using the triiodomethane-activated catalyst in the presence of dioctyl sulfide have increased cis-1,4-linkage content and increased percent functionalities when compared to the bulk polymer prepared in the absence of dioctyl sulfide. The presence of the dioctyl sulfide during the bulk polymerization decreases the rate of conversion per minute which gives improved control of the polymerization exotherm and prevents gel formation inside the reactor.

Example 4

The same procedure as described in Example 1 was used in Example 4 except 2.35 mL of 1.0 M DIBAH in hexane was added to the catalyst solution and 3.12 mL of 0.025 M $CBr_4$ in hexane was added to the catalyst solution in place of $CHI_3$. Information relative to the polymerization and the polymer produced is provided in Table I.

TABLE I

| Example | 1 | 2 | 3 | 4 | 5 | 6 |
| --- | --- | --- | --- | --- | --- | --- |
| NdV/MAO/DIBAH/$CHI_3$ | 1/100/31/1.3 | 1/100/31/1.3 | 1/100/30/1.3 | — | — | — |
| NdV/MAO/DIBAH/$CBr_4$ | — | — | — | 1/100/30/1 | 1/100/27/1 | 1/100/36/1 |
| Dihydrocarbyl Sulfide | $Bu_2S$ | $Oct_2S$ | none | $Bu_2S$ | $Oct_2S$ | none |
| Dihydrocarbyl Sulfide/Nd | 80/1 | 80/1 | — | 80/1 | 80/1 | — |
| Nd per 100 gram Butadiene (mmol) | 0.006 | 0.006 | 0.006 | 0.006 | 0.006 | 0.006 |
| Polymerization Temperature (° C.) | 32→33 | 32→34 | 32→34 | 32→34 | 32→35 | 32→36 |
| Polymerization Time (minute) | 5.8 | 7.0 | 5.0 | 3.0 | 2.5 | 1.7 |
| % Conversion | 14.0 | 15.4 | 15.2 | 11.9 | 10.6 | 12.6 |
| % Conversion per Minute | 2.4 | 2.2 | 3.0 | 4.0 | 4.2 | 7.4 |
| $ML_{1+4}$ | 23.3 | 14.3 | 23.9 | 28.5 | 25.3 | 15.2 |
| Mn (Kg/mol) | 137 | 122 | 169 | 144 | 133 | 127 |
| Mw (Kg/mol) | 187 | 166 | 203 | 219 | 215 | 179 |
| Mw/Mn | 1.4 | 1.4 | 1.2 | 1.5 | 1.6 | 1.4 |
| % Cis | 99.0 | 98.8 | 98.5 | 99.1 | 99.1 | 98.4 |
| % Trans | 0.7 | 0.9 | 1.2 | 0.7 | 0.7 | 1.4 |
| % Vinyl | 0.3 | 0.3 | 0.3 | 0.2 | 0.2 | 0.2 |
| % Functionality (DEAB) | 91 | 91 | 53 | 95 | 89 | 60 |

Example 5

The same procedure as described in Example 4 was used in Example 5 except 2.11 mL of 1.0 M DIBAH in hexane was added to the catalyst solution and $Oct_2S$ was used in place of $Bu_2S$. Information relative to the polymerization and the polymer produced is provided in Table I.

Example 6

The same procedure as described in Example 4 was used in Example 5 except 2.81 mL of 1.0 M DIBAH in hexane was added to the catalyst solution and no $Bu_2S$ was added to the 1,3-butadiene. Information relative to the polymerization and the polymer produced is provided in Table I.

Comparing Example 4 with Example 6, the polymer prepared by bulk polymerization using the tetrabromoemethane-activated catalyst in the presence of dibutyl sulfide have increased cis-1,4-linkage content and increased percent functionalities when compared to the bulk polymer prepared in the absence of dibutyl sulfide. The presence of the dibutyl sulfide during the bulk polymerization decreases the rate of conversion per minute which gives improved control of the polymerization exotherm and prevents gel formation inside the reactor.

Comparing Example 5 with Example 6, the polymer prepared by bulk polymerization using the tetrabromomethane-activated catalyst in the presence of dioctyl sulfide have increased cis-1,4-linkage content and increased percent functionalities when compared to the bulk polymer prepared in the absence of a dioctyl sulfide. The presence of the dioctyl sulfide during the bulk polymerization decreases the rate of conversion per minute which gives improved control of the polymerization exotherm and prevents gel formation inside the reactor.

What is claimed is:

1. A method for producing a polydiene, the method comprising the steps of:
    (i) forming an active catalyst by combining a lanthanide-containing compound, an alkylating agent, and a halogen source in the substantial absence of an organosulfide; and
    (ii) polymerizing conjugated diene monomer in the presence of the active catalyst and an organosulfide defined by the formula:

R—S—R where each R is independently a monovalent organic group, or where two R groups combine to form a divalent group.

2. The method of claim 1, where the active catalyst is preformed.

3. The method of claim 2, where the active catalyst is preformed in the presence of conjugated diene monomer, and where the amount of the lanthanide-containing compound employed in said step of forming an active catalyst is greater than 2 mmol of lanthanide-containing compound per 100 g of monomer.

4. The method of claim 1, where the active catalyst employed in said step of polymerizing includes less than 2 mmol of lanthanide-containing compound per 100 g of conjugated diene monomer.

5. The method of claim 1, where said step of forming takes place in the presence of less than 10 mole of the organosulfide per mole of lanthanide metal in said lanthanide-containing compound.

6. The method of claim 1, where said step of forming takes place in the complete absence of an organosulfide.

7. The method of claim 1, where the active catalyst is formed in situ in the presence of the conjugated diene monomer by introducing less than 2 mmol of lanthanide-containing compound per 100 g of the conjugated diene monomer.

8. The method of claim 1, where the alkylating agent includes methylaluminoxane.

9. The method of claim 8, where the halogen source includes a bromine-containing compound.

10. The method of claim 1, where said step of polymerizing takes place within a polymerization mixture including less than 20% by weight of organic solvent based upon the total weight of the polymerization mixture.

11. The method of claim 1, where the molar ratio of the organosulfide to the lanthanide-containing compound is from about 1 to about 120.

12. The method of claim 1, where said step of polymerizing produces a polydiene having a reactive chain end, and further comprising the step of reacting a functionalizing agent with the reactive chain end.

13. The method of claim 1, further comprising the step of introducing the organosulfide to the active catalyst prior to said step of polymerizing.

14. The method of claim 1, further comprising the step of directly and individually introducing the organosulfide to the conjugated diene monomer.

15. A method for producing a polydiene, the method comprising the steps of:
    (i) preparing a preformed catalyst by introducing a lanthanide-containing compound, an alkylating agent, a halogen source, and optionally monomer;
    (ii) independent of step (i), introducing a organosulfide; and
    (iii) polymerizing conjugated diene monomer with the preformed catalyst in the presence of the organosulfide defined by the formula:

R—S—R where each R is independently a monovalent organic group, or where two R groups combine to form a divalent group.

16. The method of claim 15, where said step of introducing an organosulfide to conjugated diene monomer forms an organosulfide/monomer blend, and where said step of polymerizing the conjugated diene monomer takes place within the organosulfide/monomer blend.

17. The method of claim 15, where the organosulfide and the preformed catalyst are introduced to the conjugated diene monomer simultaneously.

18. The method of claim 17, where the organosulfide and the preformed catalyst are introduced to the conjugated diene monomer within a single stream.

19. The method of claim 17, where the organosulfide and the preformed catalyst are introduced separately to the conjugated diene monomer.

20. The method of claim 15, where the preformed catalyst is introduced to the conjugated diene monomer after said step of introducing an organosulfide to the conjugated diene monomer.

21. The method of claim 15, where the preformed catalyst is introduced to the conjugated diene monomer prior to said step of introducing a organosulfide to the conjugated diene monomer.

* * * * *